US012725454B2

(12) United States Patent
Yilmaz

(10) Patent No.: US 12,725,454 B2
(45) Date of Patent: Sep. 1, 2026

(54) DYNAMIC SIGNATURE VERIFICATION SYSTEM TO VERIFY USER SIGNATURE USING NEURAL NETWORK

(71) Applicant: Wacom Co., Ltd., Saitama (JP)

(72) Inventor: Erdem Gokhan Yilmaz, Frome (GB)

(73) Assignee: Wacom Co., Ltd., Saitama (JP)

( * ) Notice: Subject to any disclaimer, the term of this patent is extended or adjusted under 35 U.S.C. 154(b) by 182 days.

(21) Appl. No.: 18/920,547

(22) Filed: Oct. 18, 2024

(65) Prior Publication Data

US 2026/0112206 A1 Apr. 23, 2026

(51) Int. Cl.
*G06V 40/30* (2022.01)

(52) U.S. Cl.
CPC .................................. *G06V 40/33* (2022.01)

(58) Field of Classification Search
None
See application file for complete search history.

(56) References Cited

U.S. PATENT DOCUMENTS 9,280,700 B2 * 3/2016 Kim ...................... G06V 40/37
10,503,960 B2 * 12/2019 Hong ...................... G06F 3/041
11,450,150 B2 * 9/2022 Chen ...................... G06F 21/32
11,663,817 B2 * 5/2023 Sangala .............. G06V 30/148 382/187
2004/0203594 A1 * 10/2004 Kotzin .................. G06V 40/30 455/406
2006/0088194 A1 * 4/2006 Lee ...................... G06V 40/30 382/187
2011/0238510 A1 * 9/2011 Rowen ................ G06V 40/382 705/16
2015/0071505 A1 * 3/2015 Kim .................. G06F 3/04883 382/119
2018/0247108 A1 * 8/2018 Hong .................. G06F 3/0488
2021/0124905 A1 * 4/2021 Chen ...................... G06F 21/32
2021/0342571 A1 * 11/2021 Sangala ................ G06F 18/22
2022/0392265 A1 * 12/2022 Chen ...................... G06F 21/32
2025/0231889 A1 * 7/2025 Ayyapureddi .......... G06F 13/16

* cited by examiner

*Primary Examiner* — Anand P Bhatnagar
(74) *Attorney, Agent, or Firm* — Seed Intellectual Property Law Group LLP

(57) ABSTRACT

A signature verification method is disclosed. The method includes receiving signature data and fetching reference signature data associated with a user. The method includes enriching the received signature data by adding features that are created using differential geometry on each data point of the signature data. The method also includes synchronizing the enriched signature data with the reference signature data based on a first-predefined number of time-series parameters to form a set of aligned signatures. The method includes reducing dimensions of the formed set of aligned signatures based on a second-predefined number of time-series parameters. The method includes determining if the received signature data is genuine based on the set of aligned signatures with reduced dimensions by employing a neural network.

20 Claims, 13 Drawing Sheets

DYNAMIC SIGNATURE VERIFICATION SYSTEM TO VERIFY USER SIGNATURE USING NEURAL NETWORK

BACKGROUND

Technical Field

The present disclosure relates to the field of signature verification, and in particular, relates to a dynamic signature verification system to verify a user signature using a neural network.

Description of the Related Art

Signature verification is a biometric technique that utilizes characteristics of a user's signature to authenticate the user. Typically, the signature verification requires storing reference signature data of the user and verifying new signature against the reference signature to authenticate the user. The reference signature is stored in the form of static signature data and dynamic signature data. The static signature data includes texture and topological features of a signature, and the dynamic signature data includes one or more real-time features associated with signing such as pressure values, breakpoints, and the time taken to create the signature using a tablet or electric pad. The signature verification utilizes such stored reference signature data to match it with the signature data of the signature on the document to authenticate the digital signing of the document. Thus, in order for the signature to be authenticated, the signature needs to match the reference signature with a high accuracy both in terms of the static signature data and the dynamic signature data. There are several existing signature verification techniques that calculate a probability of a signature being genuine by comparing the signature with the pre-stored reference signatures, and if the calculated probability is higher than a predefined threshold, the signature is considered genuine. However, there are instances where a user's signature is not verified despite being genuine (false negatives). There are also instances of false positives where imitated signatures were given a higher probability of being genuine. Therefore, there is a need for an improved signature verification system and method.

Additionally, it has been observed that the writing style of the user gradually changes over time, and thus the original reference signature may become an inaccurate reference to authenticate the user. The advancement in technology has allowed the updating of the reference signature data over time to overcome the issue of the changing writing style of the user. However, such updating in the known technologies is typically based on manual updating of the reference signature data by the user. Consequently, the known technology only slightly mitigates the issue of outdated reference signature data in signature verification. A need exists for enhancing the updating of the reference signature data.

Moreover, a significant challenge in signature verification arises from the diversity of signatures worldwide, specifically in the context of western style signatures and eastern style signatures. The western style signatures, prevalent in many European and American cultures, often prioritize legibility and clear letter formations, whereas, the eastern style signatures, such as those found in many Asian cultures, often feature intricate characters and stylized brushwork, which may not align with the traditional parameters used in signature verification systems primarily designed for the western style signatures. The existing signature verification technologies struggle to accurately identify and authenticate signatures from different cultural backgrounds, leading to authentication errors and reduced effectiveness of the verification process. Addressing this challenge is crucial for creating a universally applicable signature verification system that can accurately authenticate signatures across diverse cultural styles.

Thus, there is a pressing need for an improved signature verification system to overcome the above-mentioned drawbacks, including the challenges associated with identifying western style signatures and eastern style signatures, and other drawbacks of the known technologies to increase the probability of correct authentication of the user.

BRIEF SUMMARY

One or more embodiments are directed to a dynamic signature verification system and method to verify a user signature using a neural network.

An embodiment of the present disclosure discloses a signature verification system to verify the user signature using the neural network. The signature verification system may include a receiver module configured to receive signature data associated with a user from an electronic device. The electronic device may correspond to a touch-enabled device, a stylus-enabled device, and a pen-enabled device, and may include a mobile phone, a tablet, a personal computer, a digital signage, a smartboard, and a television. The receiver module may be configured to fetch, from a signature database, reference signature data associated with the user. The signature data may include static signature data and dynamic signature data, and the reference signature data includes static reference signature data and dynamic reference signature data. The signature verification system may also include a data cleaner configured to clean up the received signature data to remove therefrom the one or more signature issues. The one or more signature issues may include duplicated timestamp, text entries, inconsistent start, inconsistent end, zero pressure when pen down, and non-zero pressure when pen up, or a combination thereof, as will be more fully described below.

In an embodiment of the present disclosure, the signature verification system may also include a scientific flow enricher to enrich the received signature data by adding one or more features. The one or more features may be created using differential geometry on each data point of the signature data. The one or more features may be associated with at least one of pen down data and pen up data. The one or more features may include tangent vector, normal vector, acceleration, curvature, curve length, curve speed, or a combination thereof.

In an embodiment of the present disclosure, the signature verification system may also include a signature aligner to synchronize the enriched signature data with the reference signature data based on a first-predefined number of time-series parameters to form a set of aligned signatures. The signature aligner may be configured to employ an optimal alignment method such as Dynamic Time Warping (DTW) to synchronize the static signature data with the reference static signature data.

In an embodiment of the present disclosure, the signature verification system may include a normalization module to equalize the range of the values in the data set. Further, the normalization module reduces the dimension of the formed set of aligned signatures based on a second-predefined number of time-series parameters. Further, the signature verification system may include a smoothing filter to smooth out the formed set of aligned signatures with reduced dimensions by utilizing a moving average filter to improve prediction accuracy.

In an embodiment of the present disclosure, the signature verification system may include a predictor to determine if the received signature data is genuine, based on the set of aligned signatures with reduced dimensions by employing the neural network. In an embodiment of the present disclosure, the predictor may be configured to employ a Long Short-Term Memory (LSTM) layer of a neural network to determine a similarity percentage between the signature data and the reference signature data based on the aligned signatures with reduced dimensions. Such neural network may be trained on western style signatures, eastern style signatures, or both. Upon determining the similarity percentage, the neural network may be configured to determine whether the determined similarity percentage is more than a predefined threshold value to predict whether the received signature data is genuine or not.

An embodiment of the present disclosure discloses a signature verification method to verify the user signature using a neural network. The signature verification method may include receiving signature data associated with a user from an electronic device. The electronic device may correspond to a touch-enabled device, a stylus-enabled device, and a pen-enabled device and may include a mobile phone, a tablet, a personal computer, a digital signage, a smart-board, and a television.

Upon receiving the signature data, the signature verification method may include the steps of fetching reference signature data associated with the user from a signature database. The signature data may include static signature data and dynamic signature data, and the reference signature data includes static reference signature data and dynamic reference signature data. The signature verification method further includes the steps of cleaning the received signature data by removing one or more signature issues. The one or more signature issues includes duplicated timestamps, text entries, inconsistent start, inconsistent end, zero pressure when pen down, non-zero pressure when pen up, loss of data when pen down, or a combination thereof.

After cleaning the received signature data, the signature verification method includes enriching the received signature data by adding one or more features that are created using differential geometry on each data point of the signature data. The one or more features may be associated with pen down data and pen up data, and may include tangent vector, normal vector, acceleration, curvature, curve length, curve speed, or a combination thereof. This enrichment is applied to both the received and reference signature.

Upon enriching the both signature datasets, the signature verification method includes the steps of synchronizing the enriched signature data (for aligning) with the reference signature databased on a first-predefined number of time-series parameters. In an embodiment of the present disclosure, the signature verification method includes employing an optimal alignment method such as Dynamic Time Warping (DTW) to synchronize the signature data with the reference signature data.

Upon synchronizing the enriched signature data with the reference signature data, the signature verification method includes the steps of reducing dimensions of the formed set of aligned signatures. This reduction is based on a second-predefined number of time-series parameters. The signature verification method also includes the steps of smoothing (to eliminate the jittery content) of the formed dataset of aligned signatures. Further, the smoothing utilizing a moving average filter to improve prediction accuracy.

Thereafter, the signature verification method includes the steps of determining if the received signature data is genuine based on the set of aligned signatures with reduced dimensions by employing a neural network by feeding the synchronized signatures to the neural network. For such determination, the signature verification method includes employing a Long Short-Term Memory (LSTM) layer of the neural network to determine a similarity probability between the signature data and the reference signature data based on the set of aligned signatures with reduced dimensions. Such LSTM layer may be trained on western style signatures, eastern style signatures, or both. The method utilizes the trained similarity metric, i.e., the neural network, to make a probabilistic decision on whether the acquired signature is genuine or not. Further, the method also includes determining whether the determined similarity percentage is more than a predefined threshold value to predict whether the received signature data is genuine, otherwise as imitation.

The technical features and advantages of the subject matter will become more apparent in light of the following detailed description of selected embodiments. As will be realized, the subject matter disclosed is capable of modification in various respects. Accordingly, the description including the accompanying drawings is to be regarded as illustrative in nature.

BRIEF DESCRIPTION OF THE SEVERAL VIEWS OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
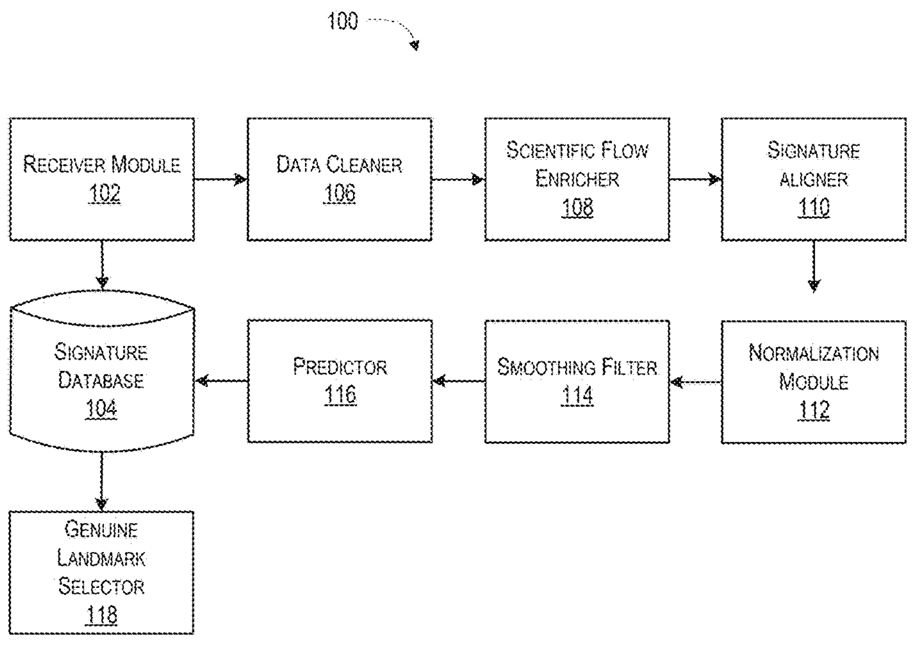
FIG. 1 illustrates a block diagram of a signature verification system, in accordance with various embodiments of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes which illustrate systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, or through the interaction of program control and dedicated logic, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

FIG. 1 illustrates a block diagram of a signature verification system 100, in accordance with various embodiments of the present disclosure. The signature verification system 100, for the purpose of the disclosure, may correspond to a system for verifying the authenticity of a user's signature by analyzing corresponding static signature data and dynamic signature data associated with the user's signature. The static signature date may correspond to the geometrical data associated with the user's signature, such as in the form of an image. The dynamic signature data may correspond to a chronological sampling of the signature movement, such as pressure, pen up data, pen down data, time stamps, or the like.

In an embodiment of the present disclosure, the signature verification system 100 may be implemented on a server, such that the signature data may be received from an electronic device and the verification process may be performed on the server. The electronic device may correspond to a touch-enabled device, a stylus enabled device, and pen-enabled device configured to permit a user to input the signature data in association with the user signing his or her name on a screen via touch, stylus, and pen, respectively. Accordingly, the electronic device may, without any limitation, include a mobile phone, a tablet, a personal computer, a digital signage, a smartboard, and a television. In another embodiment of the present disclosure, the signature verification system 100 may be implemented on the electronic device, such that the signature data may be received from the screen of the electronic device and the verification process may be performed by one or more modules in the electronic device.

In an embodiment of the present disclosure, the signature verification system 100 may include a receiver module 102, a signature database 104, a data cleaner 106, a scientific flow enricher 108, a signature aligner 110, a normalization module 112, a smoothing filter 114, a predictor 116, and a genuine landmark selector 118. The receiver module 102, the signature database 104, the data cleaner 106, the scientific flow enricher 108, the signature aligner 110, the normalization module 112, the smoothing filter 114, the predictor 116, and the genuine landmark selector 118 may be communicatively coupled to a memory and a processor of the signature verification system 100.

The processor may be configured to control the operations of the receiver module 102, the signature database 104, the data cleaner 106, the scientific flow enricher 108, the signature aligner 110, the normalization module 112, the smoothing filter 114, the predictor 116, and the genuine landmark selector 118. In an embodiment of the present disclosure, the processor and the memory may form a part of a chipset installed in the signature verification system 100. In another embodiment of the present disclosure, the memory may be implemented as a static memory or a dynamic memory. In an example, the memory may be internal to the signature verification system 100, such as an onside-based storage. In another example, the memory may be external to the signature verification system 100, such as cloud-based storage. Further, the processor may be implemented as one or more microprocessors microcomputers, microcomputers, digital signal processors, central processing units, state machines, logic circuitries, and/or any devices that manipulate signals based on operational instructions.

In an embodiment of the present disclosure, the receiver module 102 may be configured to receive the signature data associated with the user. The signature data may be received from the electronic device in the form of tuples such as (t1, x1, y1, p1), (t2, x2, y2, p2) . . . (tn, xn, yn, pn), wherein t may be timestamp, x may be x-coordinate, y may be y-coordinate, and p may be pressure. In one scenario, the signature data may be received in real-time as the user is signing his or her name on the screen of the electronic device. In another scenario, the signature data may be first saved in a memory associated with the electronic device and then may subsequently be received by the receiver module 102.

In an embodiment of the present disclosure, the signature database 104 may be configured to store reference signature data associated with the user, one or more signature issues associated with the user, a pool of genuine signatures, and a pool of potential genuine signatures. The reference signature data includes static reference signature data and dynamic reference signature data. Further, the signature database 104 may have the capability to autonomously update the reference signature data based on verification results over time. This autonomous update capability may allow the stored reference signature data to be dynamic in nature and adaptive to the variations in the signatures of the user that may have occurred over time. The autonomous updating of the reference signature may be explained in detail in the following paragraphs.

The one or more signature issues stored in the signature database 104 may, without any limitation, include duplicated timestamp, text entries, inconsistent start, inconsistent end, zero pressure when pen down, non-zero pressure when pen up, or a combination thereof. In a non-limiting embodiment, the signature database 104 may have the capability to autonomously update the one or more signature issues based on various irregularities during signature verification over time. This autonomous update capability may allow the stored one or more signature issues to be dynamic in nature and adaptive to the irregularities in the signatures of the user that may have occurred over time.

The pool of genuine signatures may correspond to a plurality of genuine signatures of the user that have been verified overtime during the signature verification. The pool of potential genuine signatures may correspond to a plurality of signatures that are similar to the genuine signature but have not been verified during the signature verification.

In an embodiment of the present disclosure, the receiver module 102 may be communicatively coupled to the signature database 104 to fetch the reference signature data associated with the user. In an embodiment of the present disclosure, the receiver module 102 may be configured to match a user ID associated with the receiver signature data with one or more user IDs stored in the signature database 104 to fetch the associated reference signature data.

In an embodiment of the present disclosure, the data cleaner 106 may be configured to clean the received signature data to remove the one or more signature issues. The operation of the data cleaner 106 for cleaning the received signature data to remove the signature issues will be discussed in detail in the following paragraphs.

In an embodiment of the present disclosure, the scientific flow enricher 108 functions to enrich the received signature data by adding one or more features. The one or more features may be associated with pen down data and pen up data and may be created using differential geometry on each data point of the signature data. The one or more features may, without any limitation, include tangent vector (T), normal vector (N), acceleration (A), curvature (C), curve length (L), and curve speed (S). Accordingly, the enriched data may have a form (t, x, y, p, T, N, A, C, L, S . . . ). The data enriching by the scientific flow enricher 108 will be discussed in detail in the following paragraphs.

In an embodiment of the present disclosure, the signature aligner 110 may be configured to synchronize the enriched signature data with the reference signature data to form a set of aligned signatures. The signature aligner 110 may be configured to employ an optimal alignment technology to synchronize the signature data with the reference signature data based on a first-predefined number of time-series parameters to form the set of aligned signatures. The time-series parameters may be associated with data on x-axis, data on y-axis, timestamp on data, pressure, data produced by the scientific flow enricher 108, or a combination thereof. Further, the data produced by the scientific flow enricher 108 may, without any limitation, correspond to the tangent vector (T), the normal vector (N), the acceleration (A), the curvature (C), the curve length (L), and the curve speed (S). In an embodiment, the optimal alignment technology may be a Dynamic Time Warping (DTW). In another embodiment, the optimal alignment technology may be any other technique known in the art to synchronize two types of signature data. For example, the signature aligner 110 may provide a mapping between the tuples of the reference signature S1: (t, x, y, p, T, N, A, C, L, S . . . ) and the received signature S2: (t1, x1, y1, p1, T1, N1, A1, C1, L1, S1 . . . ). The synchronization of the enriched signature and the reference signature by the signature aligner 110 will be discussed in detail in the following paragraphs.

Figure 5A:
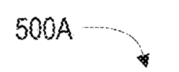
FIG. 5A illustrates a graph showing normalization of a set of aligned signatures, in accordance with an embodiment of the present disclosure.
Figure 5A:
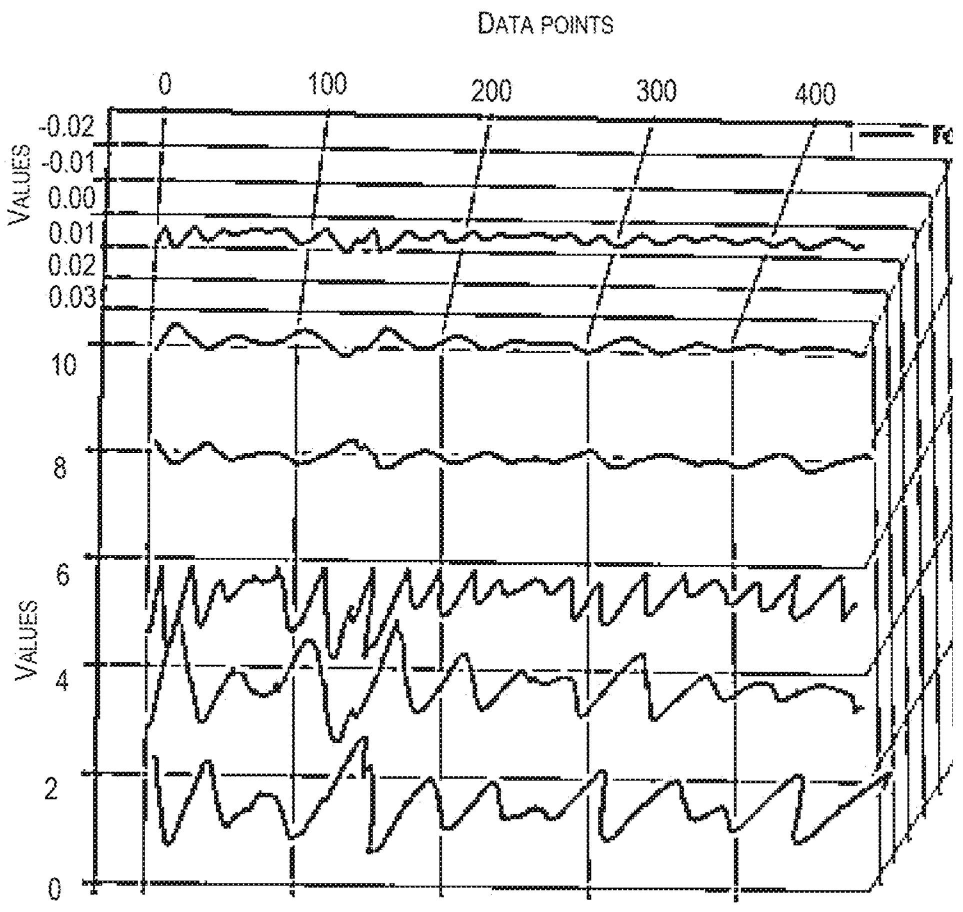

In an embodiment of the present disclosure, the normalization module 112 may be configured to adjust the lower and higher bounds of the signature data by scaling the content. The dimensions of the formed set of aligned signatures may be reduced, based on a second-predefined number of time-series parameters. In an embodiment, the aligned signatures received by the normalization module 112 may be a bundle of time series and may be in a form of 'N×M' where 'N' may represent a number of samples per signature and 'M' may represent a number of all features. The normalization module 112 may reduce the number of features from 'M' to 'R', where 'R' represents the new, reduced number of features and signature data bundle becomes 'N×R'. The aforementioned, pre-determined features used in reduction of dimensions, may be obtained at the end of an offline optimization process. In an embodiment, the N×R bundle may have a varied number of dimensions, such as from −1000s to 1000s, normalization may replace such range of values to a range between −1 to 1. This scaling may improve the accuracy of the prediction. In an illustrated embodiment, the FIG. 5A shows a graph 500A having a subset of features of the reference signature where each line represents individual features to form the N×R bundle altogether.

Figure 5B:
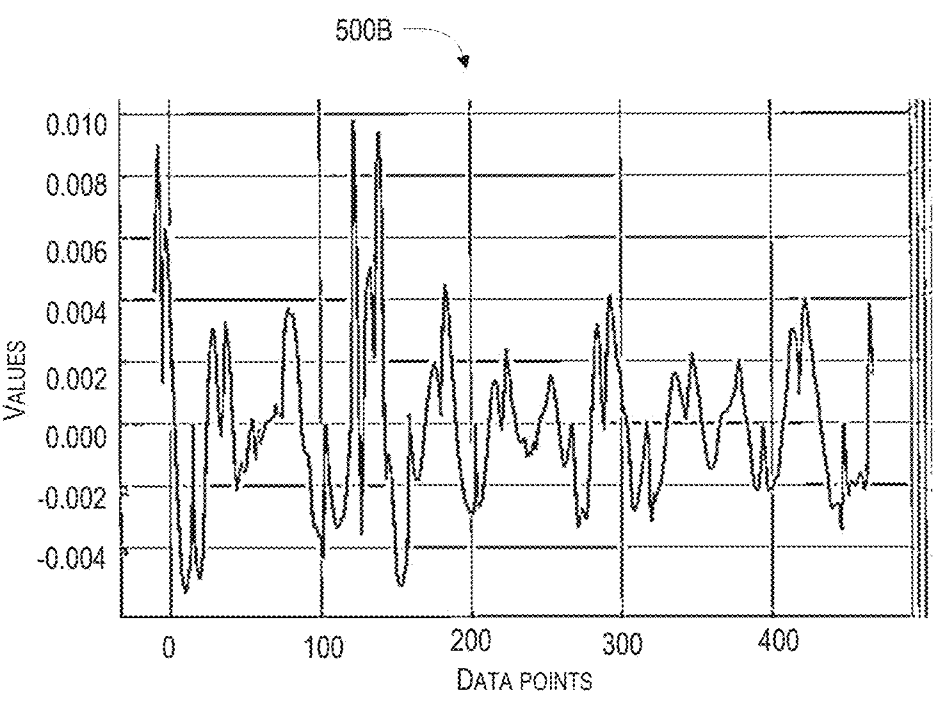
FIG. 5B illustrates a graph showing unfiltered data fed to smoothing filter, in accordance with an embodiment of the present disclosure.
Figure 5C:
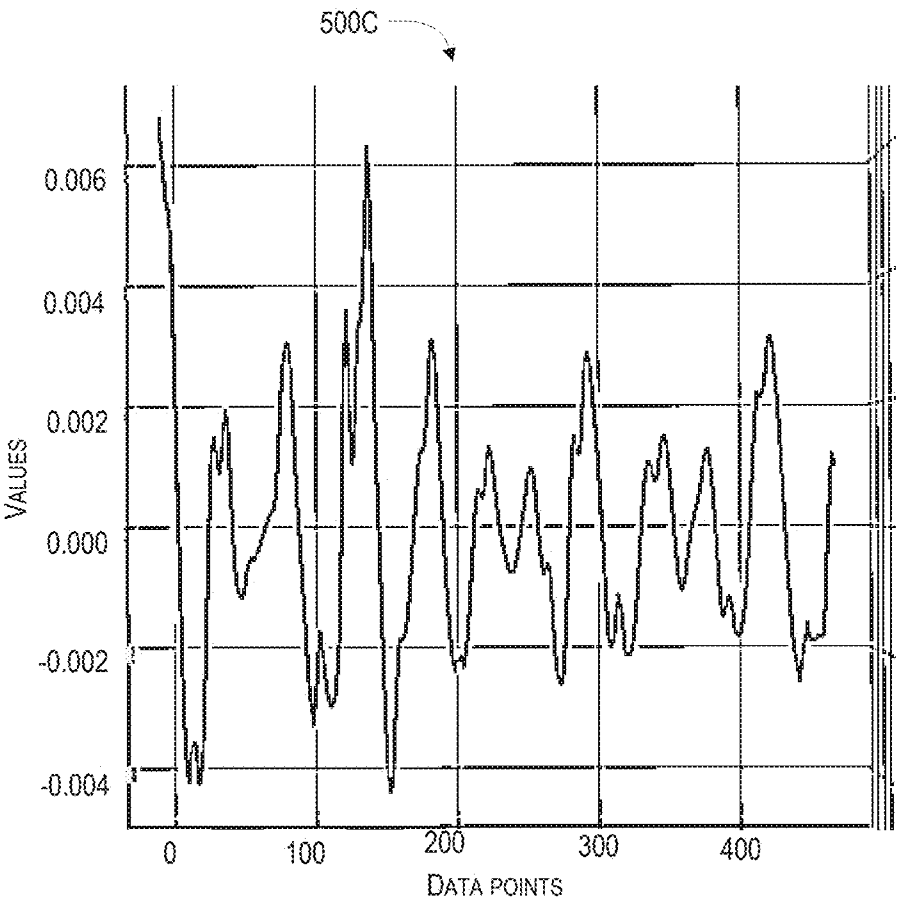
FIG. 5C illustrates a graph showing filtered data received from the smoothing filter, in accordance with an embodiment of the present disclosure.

In an embodiment of the present disclosure, the smoothing filter 114 may be configured to smooth out the formed set of aligned signatures with reduced dimensions. Such smoothing may be performed by utilizing a moving average filter to improve the prediction accuracy. In implementation, the N×R time series bundle, with N samples and R features may be passed through the smoothing filter 114. In an embodiment, since 2nd derivatives of the features contain jittery content, the filter may be applied only to the features that are 2nd derivatives of other features, such that the moving average filter may smooth out such features. In an illustrated embodiment, FIG. 5B shows a graph 500B of unfiltered data with jittery content that may be smoothed out by the smoothing filter 114 into filtered smooth data, as shown by a graph 500C in FIG. 5C.

In an embodiment of the present disclosure, the predictor 116 may be configured to determine if the received signature data is 'genuine' or 'not genuine'. In order to determine whether the received signature data is genuine or not, the predictor 116 may be configured to provide the set of aligned signatures with reduced dimensions to a neural network which has Long Short-Term Memory (LSTM) layer(s). Such LSTM layer may be trained on the type of signatures prioritizing legibility and clear letter formation (such as western style signatures), and/or the type of signatures that feature intricate characters and stylized brushwork (such as eastern style signatures). The neural network may be configured to determine a similarity probability between the signature data and the reference signature data based on the set of aligned signatures with reduced dimensions. Upon determining the similarity probability, the predictor 116 may be configured to compare the determined similarity output/probability with a predefined threshold value. In one scenario, the predictor 116 may determine the received signature data as 'genuine' if the similarity probability is more than a predefined threshold value. In another scenario, the predictor 116 may determine the received signature data as 'not genuine' if the similarity probability is less than a predefined threshold value. In an embodiment of the present disclosure, the predefined threshold value may be a value selected from a range of 0.5-0.9. Accordingly, the similarity probability may be rounded to 0 for 'not genuine signature' and 1 for 'genuine signature'. The operation of the LSTM layer to determine whether the received signature is 'genuine' or 'not genuine' is explained in detail in the following paragraphs.

In an embodiment of the present disclosure, if the received signature data is 'genuine', then the predictor 116 may be further configured to store the received signature data in the pool of genuine signatures of the user in the signature database 104. In another embodiment of the present disclosure, if the received signature data is 'not genuine', then the predictor 116 may be configured to send a prompt message to the electronic device for a second attempt.

Upon receiving the signature data in the second attempt, signature verification may again be performed over the signature data received in the second attempt. In an embodiment of the present disclosure, if the signature data received in the second attempt is determined as 'not genuine', then the signature verification system 100 may be configured to request the user for another attempt a predefined number of times. If the signature data received after the predefined number of times is still determined as 'not genuine', then the signature verification system 100 may be configured to perform blocking future attempts, locking the user profile, alerting the user, or a combination thereof.

In another embodiment of the present disclosure, if the signature data received in the second attempt is determined as 'genuine', then the genuine landmark selector 118 may be configured to store the received signature data of the first attempt that is determined as 'not genuine' in a pool of potential genuine signatures based on a configurable set of system parameters. The configurable set of system parameters may be customizable based on the user requirements and may, without any limitation, include a potential genuine threshold, a verification time lag, and a verification signature threshold. The potential genuine threshold may correspond to a minimum prediction percentage that is required to allow the received signature to be considered as a potential genuine signature. The verification time lag may correspond to a maximum time difference between the potential genuine signature and the reference signature, such that if the difference between the timestamps of the two signatures is greater than the verification time lag threshold, then the potential genuine signature is discarded. The verification signature prediction percentage is tested against the verification signature threshold, such that if the verification signature prediction percentage is less than the verification signature threshold, then the potential genuine signature is discarded, else the potential genuine signature enters the pool of potential genuine signatures. In an embodiment of the present disclosure, the potential genuine threshold, the verification time lag, and the verification signature threshold may be selected from ranges of 30-50%, 0-60 seconds, and 50-80%, respectively.

Upon storing, the genuine landmark selector 118 may be configured to verify the signature data stored in the pool of potential genuine signatures if any succeeding signature data is found similar to the signature data stored in the pool of potential genuine signatures. Upon verifying, the signature database 104 may be configured to update the reference signature data with the verified signature data from the pool of potential genuine signatures.

In an embodiment of the present disclosure, the genuine landmark selector 118 may be configured to update the reference signature data stored in the signature database 104.

Figure 2:
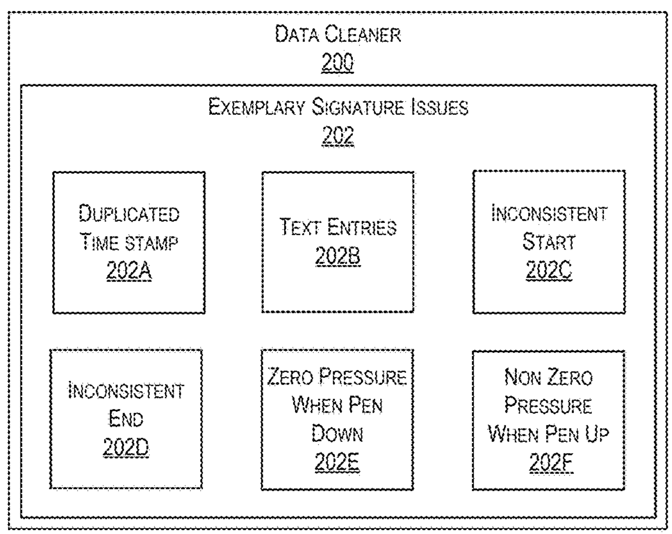
FIG. 2 illustrates one or more signature issues to be cleaned up in data cleaning by a data cleaner, in accordance with an embodiment of the present disclosure.

FIG. 2 illustrates the one or more signature issues 202 to be cleaned up in data cleaning by the data cleaner 200, in accordance with an embodiment of the present disclosure.

In one scenario, when the signature issue 202 is the duplicated timestamp 202A corresponding to one or more records in the signature containing exactly the same value of 't' but different values of 'x', 'y', and 'p' due to an issue of the electronic device or driver or operating system or framework, then the data cleaner 200 may be configured to keep the last record and remove other records. For example, if the dataflow includes the tuples (t1, x1, y1, p1), (t1, x2, y2, p2), (t2, x3, y3, p3), then the data cleaner 200 cleans the dataflow to obtain (t1, x2, y2, p2) and (t2, x3, y3, p3) as the cleaned records.

In yet another scenario, when the signature issue 202 is the text entries 202B in proximity of the signatures that may affect the detection of the signature, then the data cleaner 200 may be configured to remove all such text entries to improve detection and analyzation of the signature.

In yet another scenario, when the signature issue 202 is the inconsistent start 202C corresponding to the recorded signature data starting with zero pressure due to an issue of the framework, then the data cleaner 200 may be configured to remove all records with zero pressure before the first pen down event. For example, if the dataflow includes the tuples (t1, x1, y1, 0) and (t2, x2, y2, p2), then the data cleaner 200 cleans the dataflow to obtain (t2, x2, y2, p2) as the cleaned record.

In yet another scenario, when the signature issue 202 is the inconsistent end 202D corresponding to the recorded signature data ending with zero pressure due to an issue of the framework, then the data cleaner 200 may be configured to remove all records with zero pressure after the last pen down event. For example, if the dataflow includes the tuples (t1, x1, y1, p1) and (t2, x2, y2, 0), then the data cleaner 200 cleans the dataflow to obtain (t1, x1, y1, p1) as the cleaned record.

In yet another scenario, when the signature issue 202 is the zero pressure when pen down 202E due to an issue with the framework, then the data cleaner 200 may be configured to correct the pen down field to false. For example, if the dataflow includes the tuple (t1, x1, y1, 0), then the data cleaner 200 corrects the 'pen is down' to false in the cleaned record.

In yet another scenario, when the signature issue 202 is the non-zero pressure when pen up 202F due to an issue with the framework, then the data cleaner 200 may be configured to correct the pen down field to true. For example, if the dataflow includes the tuple (t1, x1, y1, >0), then the data cleaner 200 corrects the 'pen is down' to true in the cleaned record.

Figure 3:
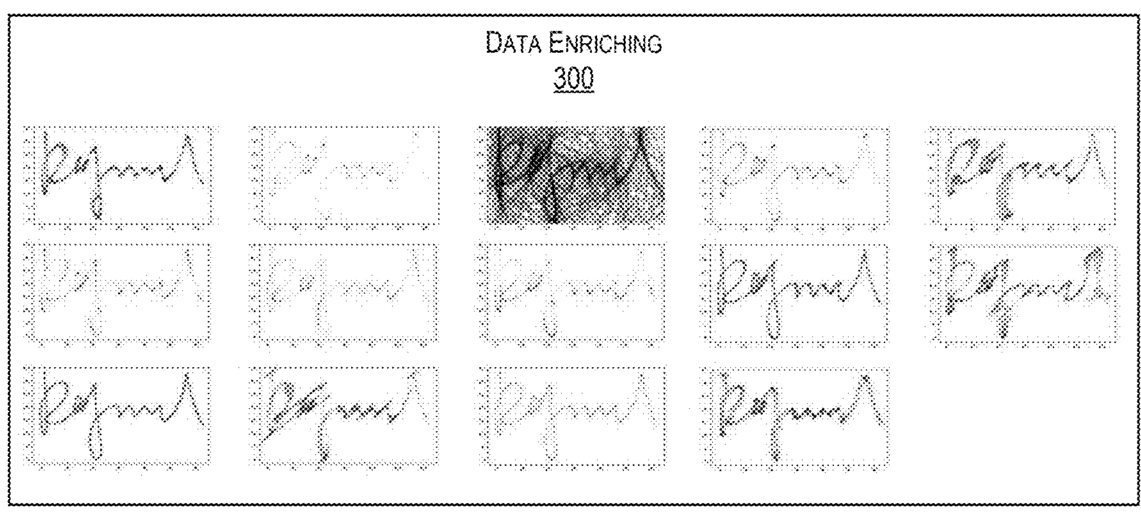
FIG. 3 illustrates data enriching by addition of one or more features by a scientific flow enricher, in accordance with an embodiment of the present disclosure.

FIG. 3 illustrates the data enriching 300 by addition of the one or more features by the scientific flow enricher, in accordance with an embodiment of the present disclosure. In an embodiment of the present disclosure, the received signature data on its own may not be enough to determine authenticity, such that the signature verification cannot be performed with optimum accuracy. For example, as shown in FIG. 3, in order to perform the signature verification with optimum accuracy, the data enriching 300 of the received signature data may be performed by adding the one or more features associated with the pen down data and the pen up data, such as tangent vector, normal vector, acceleration, curvature, curve length, and curve speed. In an embodiment, such one or more features may be 29 features.

Figure 4:
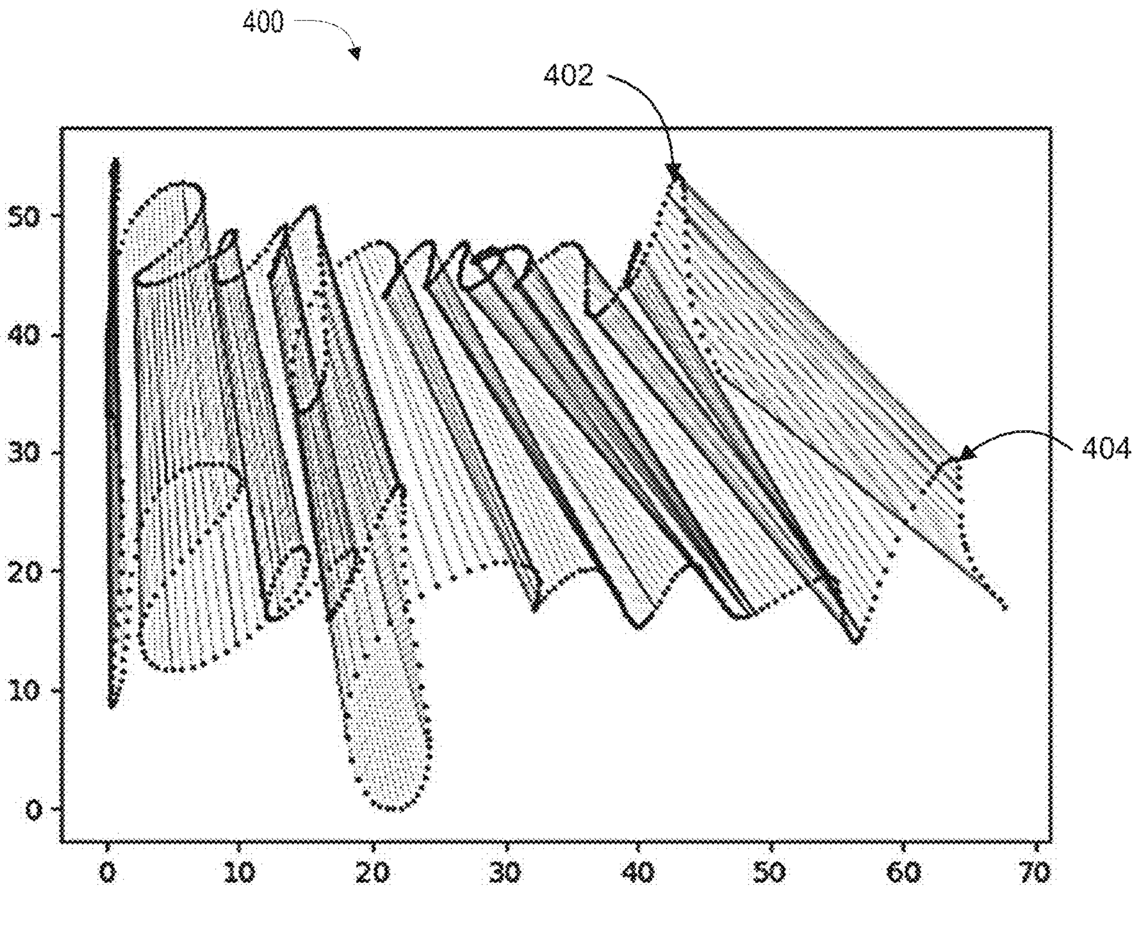
FIG. 4 illustrates synchronization of the enriched signature with a reference signature by a signature aligner, in accordance with an embodiment of the present disclosure.

FIG. 4 illustrates synchronization 400 of the enriched signature 402 with the reference signature 404 by the signature aligner 110, in accordance with an embodiment of the present disclosure. In an embodiment of the present disclosure, the enriched signature 402 may not be uniform (normalized) with the reference signature 404 such as that they may have a size difference or a flow difference, or that one signature may be stretched towards the end or towards the start. Consequently, it may not be feasible to match the reference signature 404 with the enriched signature 402 due to their non-uniform nature. Also, if the two signatures are to be matched for signature verification, the accuracy of such signature verification would be very low. Thus, to overcome such issues, the synchronization 400 of the enriched signature 402 and the reference signature 404 may be carried out by matching highs, lows, curves, and angles, based on a first-predefined number of time-series parameters such as tangent vector, normal vector, acceleration, curvature, curve length, and curve speed. The output from the signature aligner 110 may be a set of aligned signatures, as shown in FIG. 4.

Figure 6A:
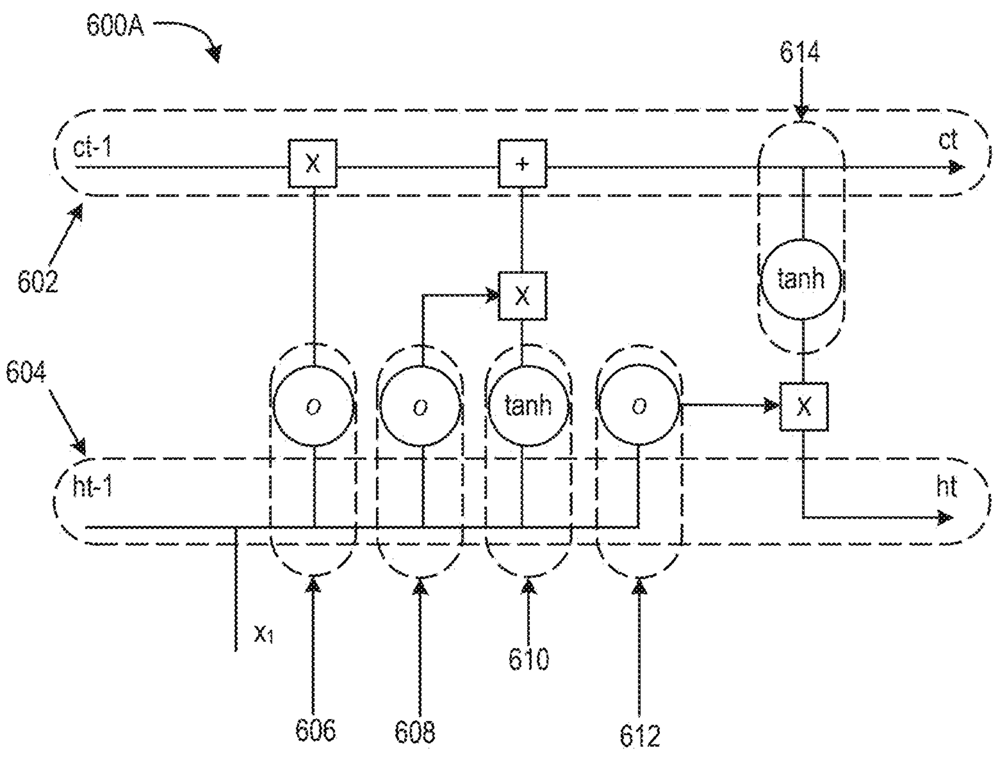
FIG. 6A illustrates a Long Short-Term Memory (LSTM) layer of a neural network employed by a predictor, in accordance with an embodiment of the present disclosure.
Figure 6B:
FIG. 6B illustrates a flow chart showing an operation of the LSTM layer, in accordance with an embodiment of the present disclosure.
Figure 6B:
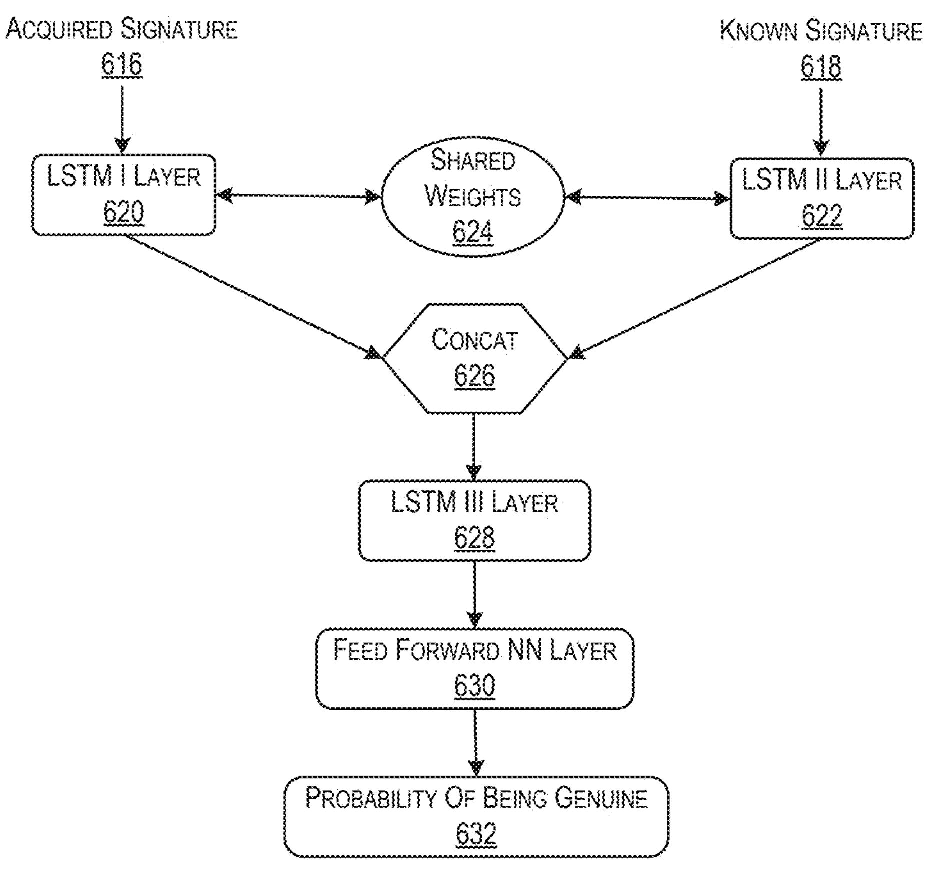

FIG. 6A illustrates the Long Short-Term Memory (LSTM) layer 600A of a neural network employed by the predictor, in accordance with an embodiment of the present disclosure. FIG. 6B illustrates a flow chart 600B showing an operation of the LSTM layer 600A, in accordance with an embodiment of the present disclosure. For the sake of brevity, FIGS. 6A and 6B have been explained together. In an embodiment of the present disclosure, the LSTM layer 600A may include a cell state 602 and a hidden state 604 having a plurality of gates communicatively coupled therebetween. The plurality of gates may, without any limitation, include a forget gate 606, an input gate 608, a candidate for cell state update 610, and an output gate 612. The LSTM layer 600A may also include an updated cell state 614 to help determine a new hidden state. In order to determine whether the received signature data is 'genuine' or 'not genuine', the LSTM layer 600A may be configured to receive the aligned and normalized signature data via the input gate 608. The LSTM layer 600 may be trained to create a similarity probability based on the similarity of the aligned signature data, and then compare the determined similarity probability with the predefined threshold value to output whether the received signature is 'genuine' or 'not genuine' via the output gate 612.

In operation, an acquired signature 616 may be received by a first layer of LSTM 620 and a known signature/reference signature 618 may be received by a second layer of LSTM 622. Such first layer of the LSTM 620 and the second layer of the LSTM 622 may have shared weights 624 and may be configured to concatenate the acquired signature 616 with the known signature 618, as shown by the block 626. Such concatenation may output a set of aligned signatures that may be provided to a third layer of LSTM 628. The output of the third LSTM layer may be passed down to Feed Forward NN layer 630, to determine the probability from the similarity probability, as shown by the block 632. The end result of the acquired signature 616 being genuine or not, depends on the value of the probability is higher than the threshold or not.

Figure 7:
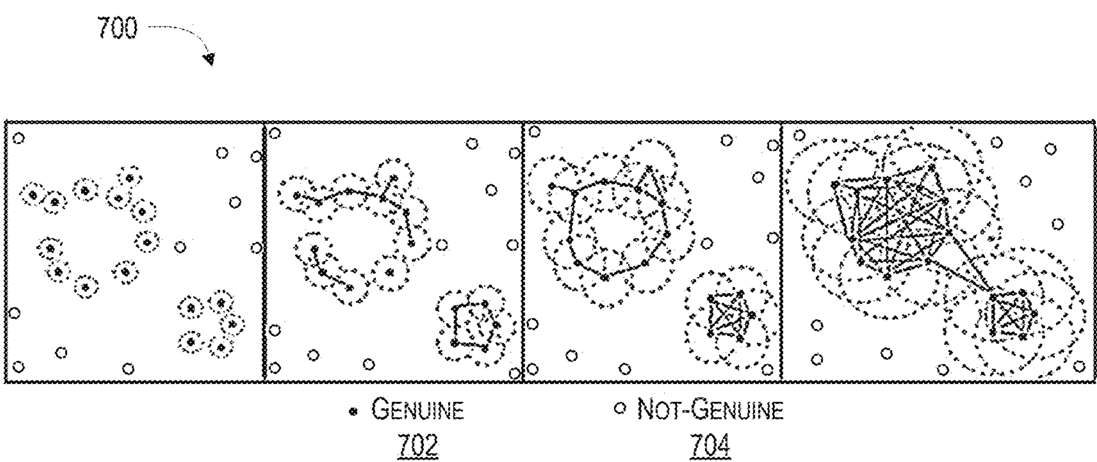
FIG. 7 illustrates an optimal parameter problem induced by lack of dimensionality in the signature data requiring a multi-component signature identification in accordance with an embodiment of the present disclosure.

FIG. 7 illustrates an optimal parameter problem induced by lack of dimensionality in the signature data requiring a multi-component signature identification 700 in accordance with an embodiment of the present disclosure. Since the signature of the user may get modified over time due to at least a change in writing styles of the user, the reference signature stored in the signature database may lead to the optimal parameter problem due to lack of dimensionality in the signature data. Thus, the genuine landmark selector may modify the reference signature stored in the signature database based on the verified signatures during signature verifications over time to increase the number of reference signatures stored in the signature database. Accordingly, during signature verification, the multi-component signature identification 700 of the signature data may be performed by comparing the signature data with the plurality of reference signatures stored in the signature database instead of only one reference signature provided at the time of initial set-up. As a result, the signature verification system eliminates the issues due to lack of dimensionality in the signature database, and improves the accuracy of signature verification. The updating of the signature database by the genuine landmark selector may be explained in conjunction with FIGS. 8A and 8B in the following paragraphs.

Figure 8A:
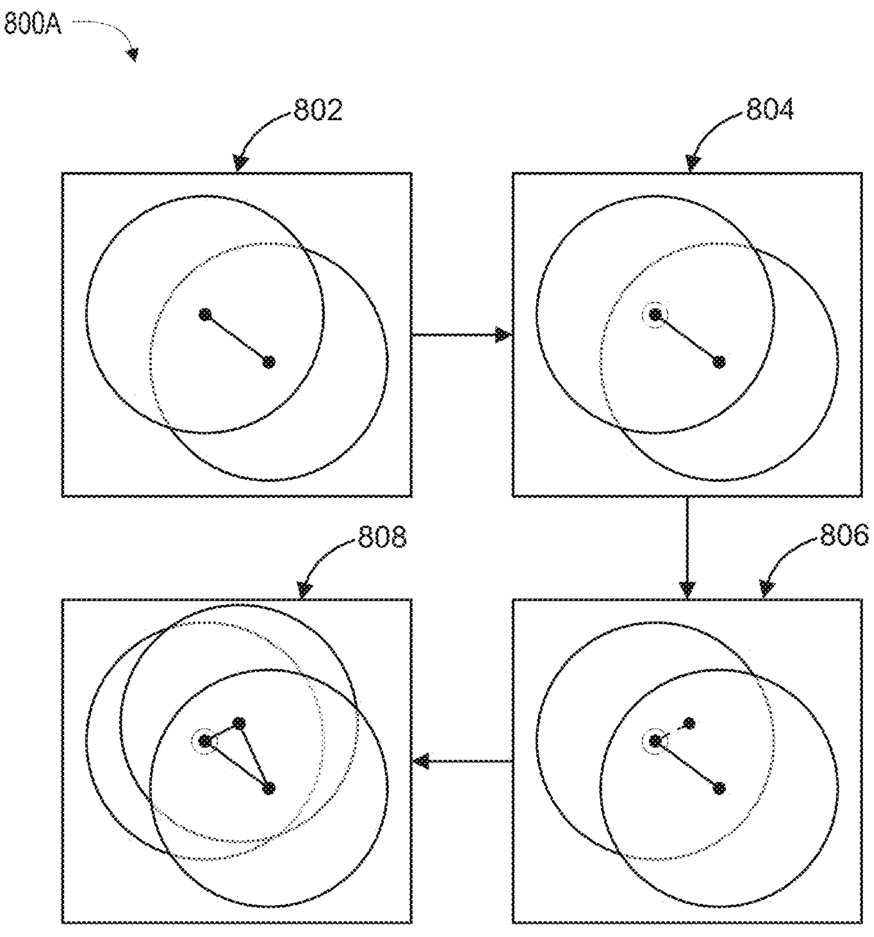
FIG. 8A illustrates an identification process of genuine signature in a single signature component by a genuine landmark selector, in accordance with an embodiment of the present disclosure.
Figure 8B:
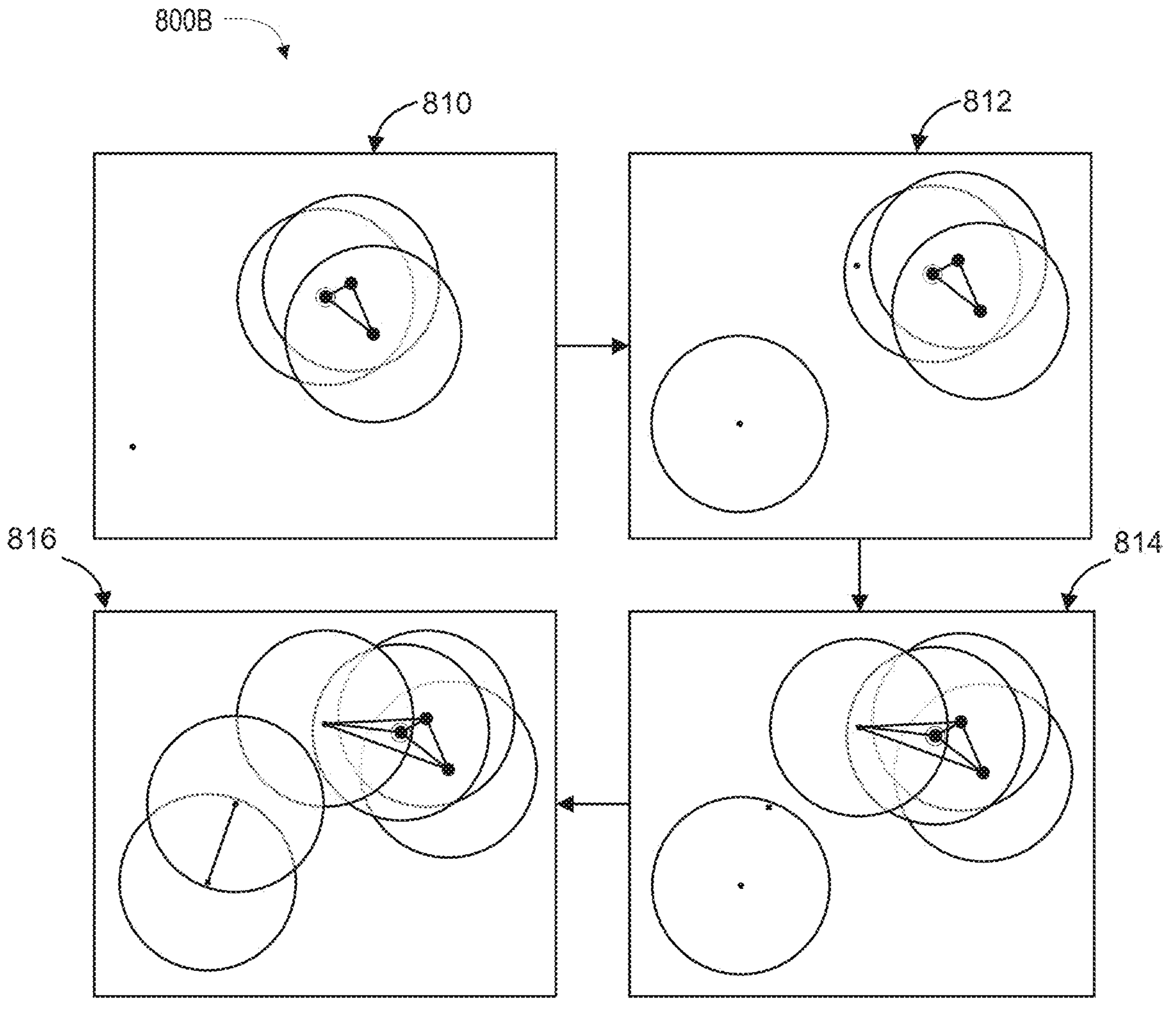
FIG. 8B illustrates the identification process of a genuine signature outlier in a single signature component by the genuine landmark selector, in accordance with another embodiment of the present disclosure.

FIG. 8A illustrates an identification process 800A of genuine signature in a single signature component by the genuine landmark selector, in accordance with an embodiment of the present disclosure. FIG. 8B illustrates the identification process 800B of a genuine signature outlier in a single signature component by the genuine landmark selector, in accordance with another embodiment of the present disclosure. For the sake of brevity, FIGS. 8A and 8B will be explained together.

In an embodiment of the present disclosure, as shown in FIG. 8A, the genuine landmark selector may be configured as an enrollment template to form a signature component using two reference signatures provided by the user, as shown by 802. In 802, the two black points represent the two reference signatures. Next, the genuine landmark selector may select a representative (the double circle) from the signature component to verify the received signature by utilizing a maximum prediction score, as shown by 804. Upon selecting the representative from the signature component, the received signature may be tested against the selected signature component to be verified as a genuine signature. Next, the verified genuine signature may be stored in the pool of genuine signatures, as shown by 806. Thereafter, the recently stored genuine signature in the pool of genuine signatures may also be utilized as a signature component for verification of the received signatures in succeeding (subsequent) verifications, as shown by 808.

In an embodiment of the present disclosure, as shown in FIG. 8B, when a tested signature is predicted as 'not genuine', as shown by 810, then the signature verification system may prompt the user to make a second attempt. Next, if the signature received in the second attempt is predicted as 'genuine', then the genuine landmark selector is configured to store the outliner in the pool of potential genuine signatures, as shown by a circle with straight-line shading in 812. The genuine landmark selector may be configured to continuously monitor succeeding (subsequent) signature verifications to determine if a (genuine) signature is placed in the neighborhood of the stored outliner to thereby validate the outliner as a potential signature component, as shown by 814. Thereafter, based on the validation of the outliner as the potential signature component, the outliner may be utilized as a second signature component for verification of signature in succeeding signature verifications, as shown by 816. As a result, the signature verification system may employ a multi-component signature identification and eliminate the issues due to lack of dimensionality in the signature database so as to improve the accuracy of signature verification.

Figure 9:
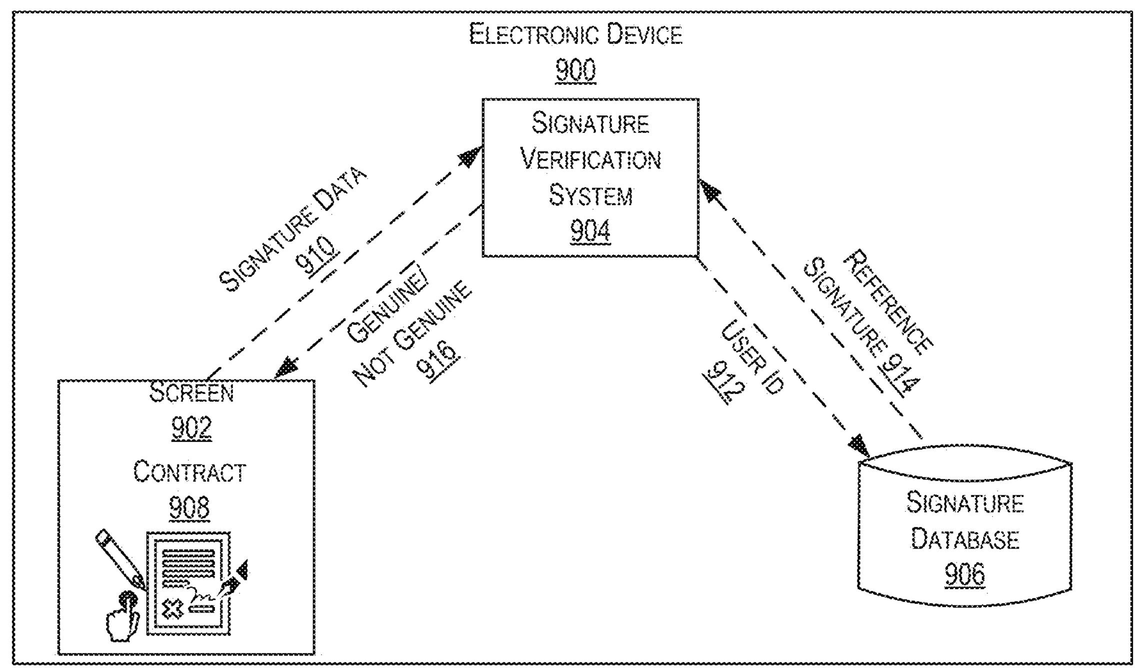
FIG. 9 illustrates an implementation of the system on an electronic device, in accordance with an embodiment of the present disclosure.

FIG. 9 illustrates an implementation of the system on an electronic device 900, in accordance with an embodiment of the present disclosure. In an embodiment of the present disclosure, the signature verification system 904 may be implemented on the electronic device 900, such that the signature data may be received from a screen 902 of the electronic device 900, and the verification process may be performed by comparing the received signature data with reference signature data stored in a signature database 906 in the device. At first, the electronic device 900 may facilitate a user to input signature data 910 by way of signing his or her name on a digital document such as a contract 908 displayed on the screen 902 of the electronic device 900. The received signature data 910 may be provided to the signature verification system 904 that may fetch the reference signature data 914 from the signature database 906 based on a user ID 912. The signature verification system 904 may perform signature verification based on one or more embodiments presented above to display whether the signature is 'genuine' or 'not genuine' 916 on the screen 902 of the electronic device 900.

Figure 10:
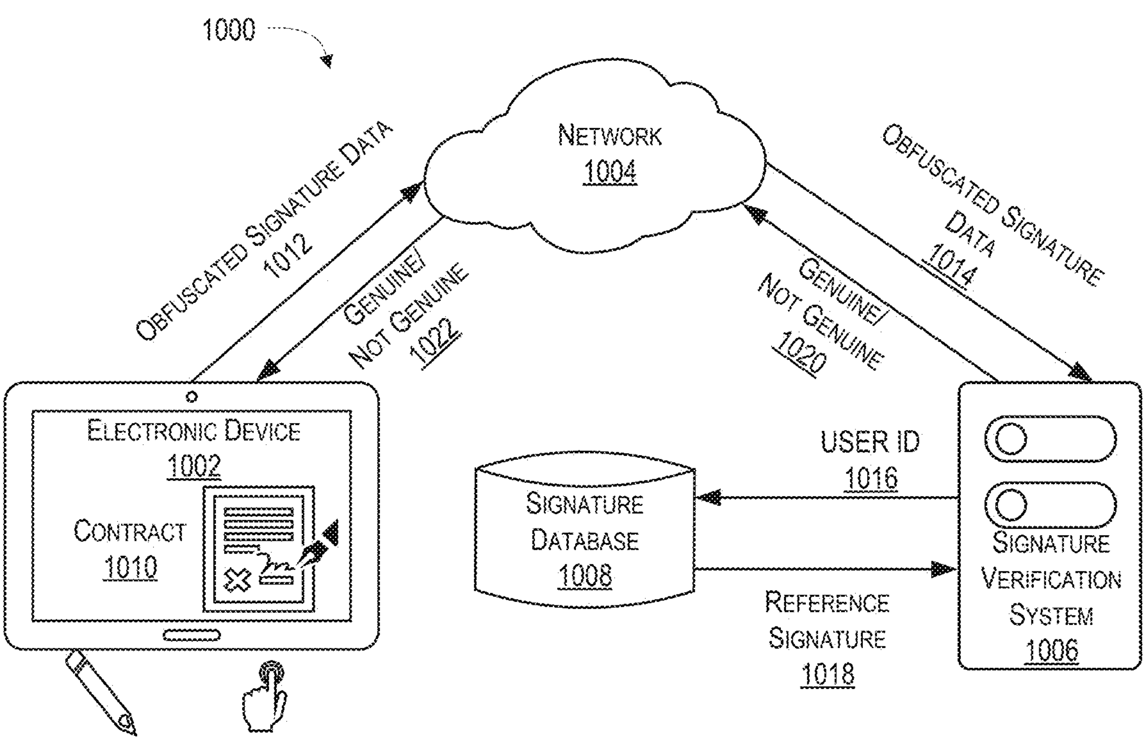
FIG. 10 illustrates an implementation of the system on a server, in accordance with another embodiment of the present disclosure.

FIG. 10 illustrates an implementation 1000 of the system on a server, in accordance with another embodiment of the present disclosure. In an embodiment of the present disclosure, the signature verification system 1006 may be implemented on a server, such that an obfuscated signature data 1012 may be received from an electronic device 1002 and the verification process may be performed on the server. In such a scenario, the electronic device 1002 may be communicatively coupled to the server-based signature verification system 1006 via a network 1004, such as the internet or intranet. At first, the electronic device 1002 may facilitate a user to input signature data by way of signing his or her name on a digital document such as a contract 1010 displayed on the screen of the electronic device 1002. Next, the electronic device 1002 may send the signature data in as the obfuscated signature data 1012 to the network 1004 for data protection. The network 1004 may then provide the obfuscated signature data 1014 to the server-based signature verification system 1006. The signature verification system 1006 may access the signature database 1008 via a user ID 1016 to fetch reference signature 1018. Further, the signature verification system 1006 may perform signature verification based on one or more embodiments presented above to provide whether the signature is 'genuine' or 'not genuine' 1020 to the network 1004. Thereafter, the network 1004 is configured to provide whether the signature is 'genuine' or 'not genuine' 1022 to the electronic device 1002 to be displayed on the screen for the user.

Figure 11:
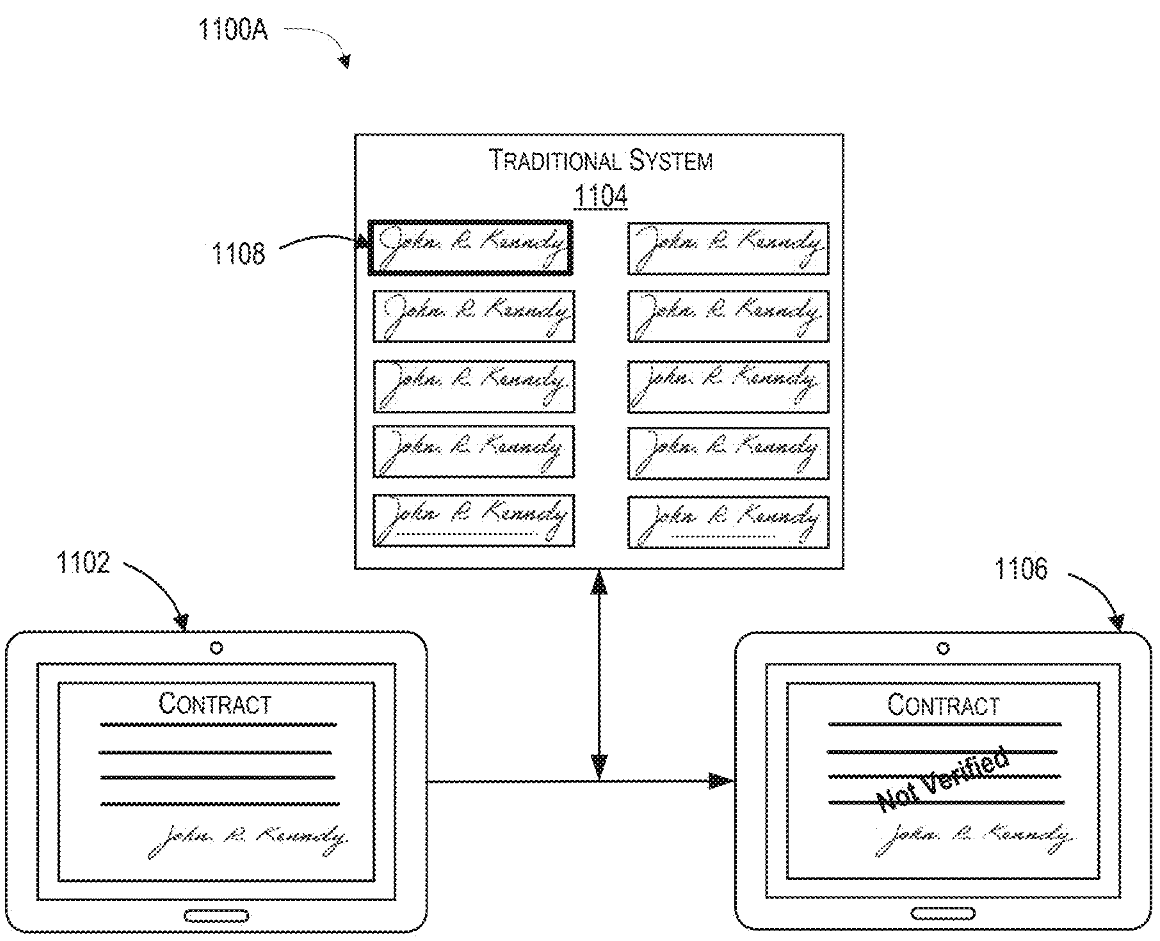
FIG. 11A illustrates signature verification via a traditional system.
FIG. 11B illustrates signature verification via the signature verification system, in accordance with an embodiment of the present disclosure.

FIG. 11A illustrates signature verification 1100A via a traditional system 1104. In the traditional signature verification system 1104, the user may sign a digital document on the screen of the electronic device, as shown by 1102. The signature data may be sent to the traditional signature verification system 1104 that may be configured to fetch a reference signature data 1108 that may have been stored in the signature database at the time of user profile setup. Since the traditional signature verification system 1104 utilizes the reference signature data 1108 stored at the time of user profile setup, it does not take into consideration any modifications that may have occurred in the user signatures over time such as due to writing style change. As a result, the traditional signature verification system 1104 cannot verify (authenticate) the signature data, as shown by 1106, even if the dissimilarity (irregularity) in the signature data is not an abrupt difference but is associated with a gradual modification that may have occurred over time. Thus, the traditional signature verification system 1104 cannot verify even genuine signatures at least due to lack of dynamically updating the reference signature data over time to incorporate modifications that may occur in the user data.

Figure 11B:
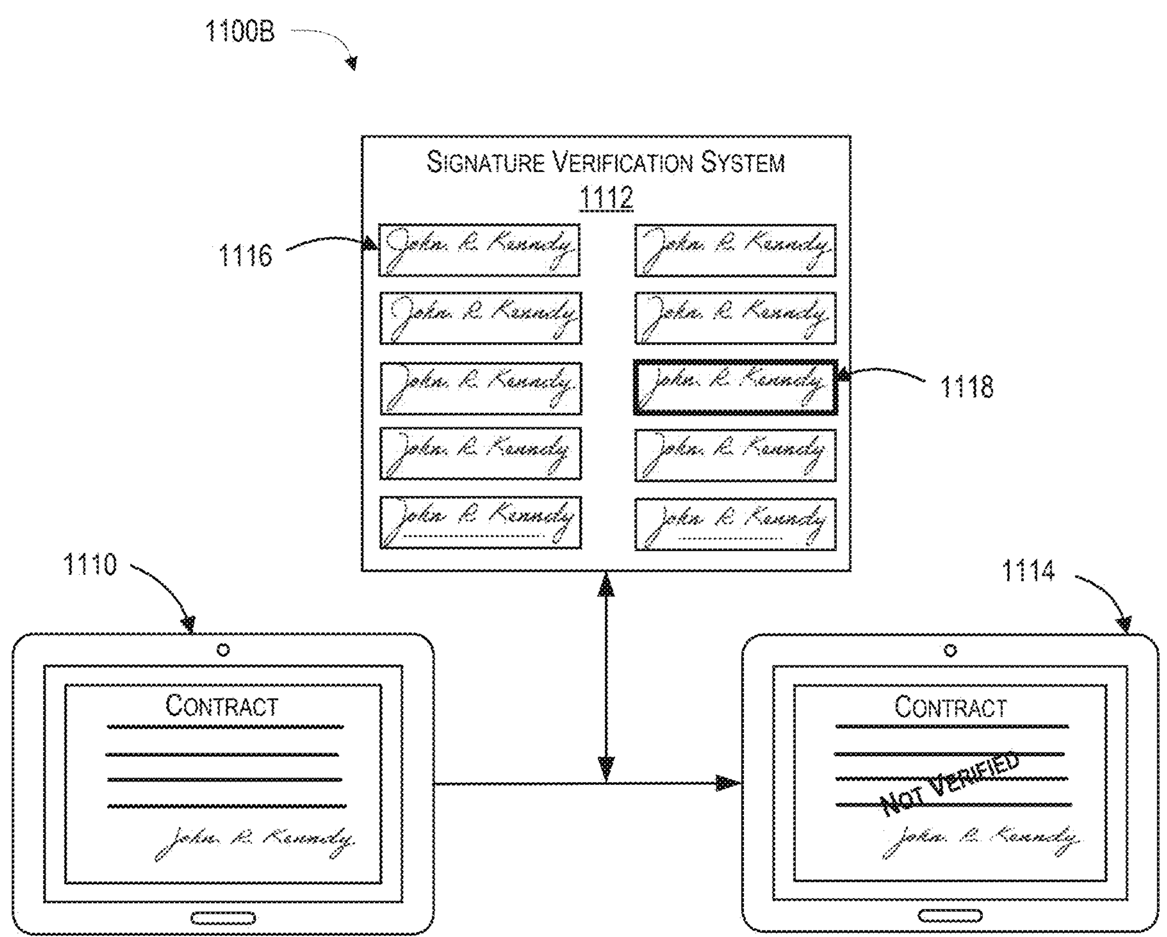

FIG. 11B illustrates signature verification 1100B via the signature verification system 1112, in accordance with an embodiment of the present disclosure. In an embodiment of the present disclosure, the signature verification system 1112 facilitates the user to sign a digital document on the screen of the electronic device, as shown by 1110. The signature data may be sent to the signature verification system 1112 that may be configured to access the signature database to fetch the most recent updated reference signature data 1118, which may have been modified from the reference signature data 1116 that had been stored in the signature database at the time of user profile setup. Since the signature verification system 1112 utilizes the reference signature data 1118 modified based on the genuine verified signatures over time, it takes into consideration the modifications that have occurred in the user signatures over time such as due to writing style change. As a result, the signature verification system 1112 verifies (authenticates) the signature data, as shown by 1114, based on the updated reference data, even if there is an irregularity in the signature data 1118 as compared with the original reference signature data 1116. Thus, the signature verification system 1112 is highly accurate in verifying genuine signatures due to its dynamic nature in updating the reference signature data over time to incorporate modifications in the user data.

Figure 12:
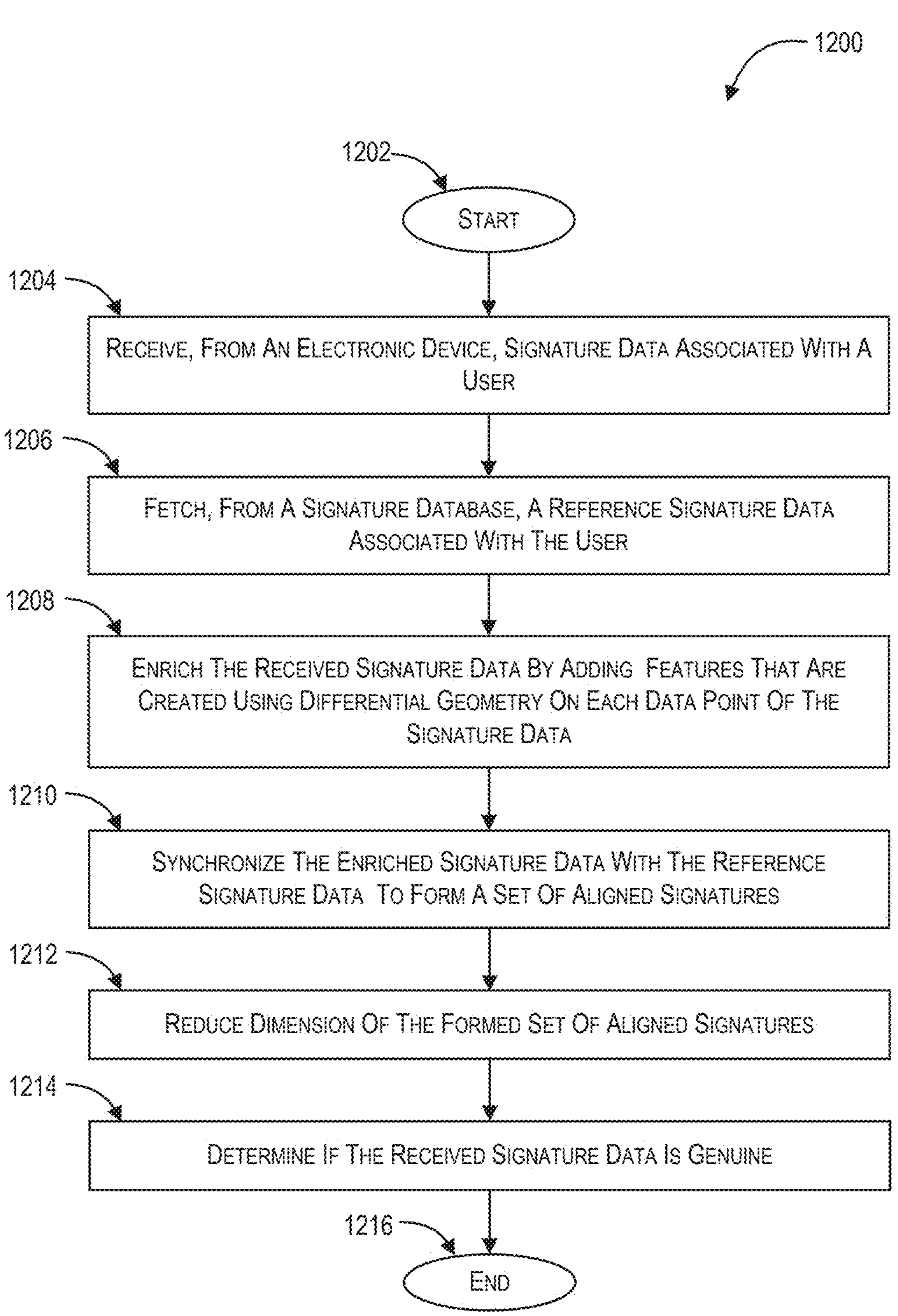
FIG. 12 illustrate a flowchart of a signature verification method, in accordance with an embodiment of the present disclosure.

FIG. 12 illustrate a flowchart 1200 of a signature verification method, in accordance with an embodiment of the present disclosure. The signature verification method starts at step 1202.

At first, signature data associated with the user may be received from an electronic device, at step 1204. The electronic device, for the purpose of the disclosure, may correspond to a touch-enabled device, a stylus-enabled device, a pen-enabled device, or a combination thereof. The electronic device may, without any limitation, include a mobile phone, a tablet, a personal computer, a digital signage, a smartboard, and a television.

At step 1206, reference signature data, associated with the user may be fetched from a signature database. In an embodiment of the present disclosure, the signature data may include static signature data and dynamic signature data, and the reference signature data may include static reference signature data and dynamic reference signature data. The method also includes the steps of cleaning the received signature data from one or more signature issues like, duplicated timestamp, text entries, inconsistent start, inconsistent end, zero pressure when pen down, non-zero pressure when pen up, or a combination thereof.

At step 1208, the received signature data may be enriched by adding one or more features. The one or more features may be created using different geometry on each data point of the signature data. The one or more features may, without any limitation, include pen down data, pen up data, tangent vector, normal vector, acceleration, curvature, curve length, curve speed, or a combination thereof.

At step 1210, the enriched signature data is synchronized with the reference signature data to form a set of aligned signatures. The synchronization of the enriched signature data may be performed based on a first-predefined number of time-series parameters. In an embodiment of the present disclosure, an optimal alignment technology such as a Dynamic Time Warping (DTW) may be employed to synchronize the signature data with the reference signature data.

At step 1212, dimensions of the formed set of aligned signatures may be reduced based on a second-predefined number of time-series parameters. The method may also include the steps of smoothing out the formed set of aligned signatured with reduced dimensions by utilizing a moving average filter to improve prediction accuracy.

At step 1214, the received signature data is determined as 'genuine' or 'not genuine' by employing a Long Short-Term Memory (LSTM) layer(s) of a neural network. Such LSTM layer may be trained based on western style signature and/or eastern style signatures. In order to determine the received signature data as 'genuine' or 'not genuine', a similarity probability between the signature data and the reference signature data is constructed based on the set of aligned signatures with reduced dimensions by employing the neural network. Then, the determined similarity probability may be checked to be more than a predefined threshold value to predict whether the received signature data is genuine or not. The method ends at step 1216.

Figure 13:
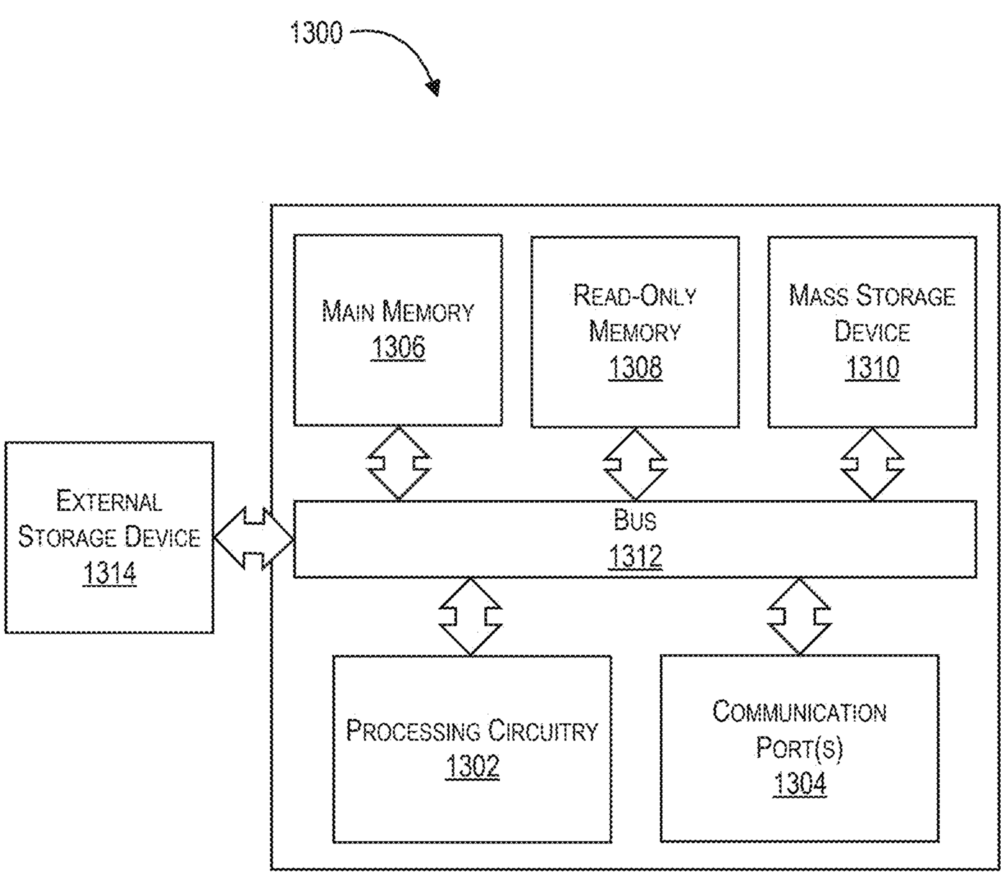
FIG. 13 illustrates an exemplary computer system in which or with which embodiments of the present disclosure may be utilized.

FIG. 13 illustrates an exemplary computer system 1300 in which or with which embodiments of the present disclosure may be utilized. As shown in FIG. 13, a computer system 1300 includes an external storage device 1314, a bus 1312, a main memory 1306, a read-only memory 1308, a mass storage device 1310, a communication port 1304, and a processor 1302.

Those skilled in the art will appreciate that computer system 1300 may include more than one processor 1302 and communication ports 1304. Examples of processor 1302 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 1302 may include various modules associated with embodiments of the present disclosure.

Communication port 1304 can be any of an RS-232 port for use with a modem-based dialup connection, a 10/100 Ethernet port, a Gigabit or 10 Gigabit port using copper or fiber, a serial port, a parallel port, or other existing or future ports. Communication port 1304 may be chosen depending on a network, such as a Local Area Network (LAN), Wide Area Network (WAN), or any network to which the computer system connects.

Memory 1306 can be Random Access Memory (RAM), or any other dynamic storage device commonly known in the art. Read-Only Memory 1308 can be any static storage device(s), e.g., but not limited to, a Programmable Read-Only Memory (PROM) chips for storing static information, e.g., start-up or BIOS instructions for processor 1302.

Mass storage 1310 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc., and Enhance Technology, Inc.

Bus 1312 communicatively couple processor(s) 1302 with the other memory, storage, and communication blocks. Bus 1312 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1302 to a software system.

Optionally, operator and administrative interfaces, e.g., a display, keyboard, and a cursor control device, may also be coupled to bus 1312 to support direct operator interaction with the computer system. Other operator and administrative interfaces can be provided through network connections connected through communication port 1304. An external storage device 1314 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

The invention claimed is:

1. A signature verification system comprising:

a receiver module configured to:

receive, from an electronic device, signature data associated with a user; and fetch, from a signature database, a reference signature data associated with the user a scientific flow enricher configured to enrich the received signature data by adding one or more features that are created using differential geometry on each data point of the signature data;

a signature aligner configured to synchronize the enriched signature data with the reference signature data based on a first-predefined number of time-series parameters to form a set of aligned signatures;

a normalization module configured to reduce dimension of the formed set of aligned signatures based on a second-predefined number of time-series parameters; and a predictor to determine if the received signature data is genuine based on the set of aligned signatures with reduced dimensions by employing a neural network.

2. The signature verification system of claim 1, wherein the electronic device corresponds to at least one of: a touch-enabled device, a stylus-enabled device, and a pen-enabled device, including at least one of: a mobile phone, a tablet, a personal computer, a digital signage, a smartboard, and a television.

3. The signature verification system of claim 1, wherein the signature data includes static signature data and dynamic signature data, and the reference signature data includes static reference signature data and dynamic reference signature data.

4. The signature verification system of claim 1, further comprising a data cleaner configured to clean the received signature data to remove one or more signature issues.

5. The signature verification system of claim 4, wherein the one or more signature issues include at least one of: duplicated timestamp, text entries, inconsistent start, inconsistent end, zero pressure when pen down, and non-zero pressure when pen up.

6. The signature verification system of claim 1, wherein the one or more features include at least one of: pen down data, pen up data, tangent vector, normal vector, acceleration, curvature, curve length, and curve speed.

7. The signature verification system of claim 1, wherein the signature aligner is further configured to employ an optimal alignment technology to synchronize the static signature data with the reference static signature data, wherein the optimal alignment technology includes at least a Dynamic Time Warping (DTW).

8. The signature verification system of claim 1, further comprising a smoothing filter configured to smooth out the formed set of aligned signatures with reduced dimensions by utilizing a moving average filter to improve prediction accuracy.

9. The signature verification system of claim 1, wherein the predictor is configured to employ a Long Short-Term Memory (LSTM) layer of a neural network to:

determine a similarity probability between the signature data and the reference signature data based on the set of aligned signatures with reduced dimensions; and determine whether the determined similarity probability is more than a predefined threshold value to predict whether the received signature data is genuine.

10. The signature verification system of claim 9, wherein the LSTM layer is trained at least one of: western style signatures and eastern style signatures.

11. A signature verification method, comprising:

receiving, from an electronic device, signature data associated with a user;

fetching, from a signature database, a reference signature data associated with the user;

enriching the received signature data by adding one or more features that are created using differential geometry on each data point of the signature data;

synchronizing the enriched signature data with the reference signature data based on a first-predefined number of time-series parameters to form a set of aligned signatures;

reducing dimension of the formed set of aligned signatures based on a second-predefined number of time-series parameters; and determining if the received signature data is genuine based on the set of aligned signatures with reduced dimensions by employing a neural network.

12. The signature verification method of claim 11, wherein the electronic device corresponds to at least one of: a touch-enabled device, a stylus-enabled device, and a pen-enabled device, including at least one of: a mobile phone, a tablet, a personal computer, a digital signage, a smartboard, and a television.

13. The signature verification method of claim 11, wherein the signature data includes static signature data and dynamic signature data, and the reference signature data includes static reference signature data and dynamic reference signature data.

14. The signature verification method of claim 11, further comprising cleaning the received signature data to remove one or more signature issues.

15. The signature verification method of claim 14, wherein the one or more signature issues include at least one of: duplicated timestamp, text entries, inconsistent start, inconsistent end, zero pressure when pen down, and non-zero pressure when pen up.

16. The signature verification method of claim 11, wherein the one or more features include at least one of: pen down data, pen up data, tangent vector, normal vector, acceleration, curvature, curve length, and curve speed.

17. The signature verification method of claim 11, further comprising employing an optimal alignment technology to synchronize the signature data with the reference signature data, wherein the optimal alignment technology includes at least a Dynamic Time Warping (DTW).

18. The signature verification method of claim 11, further comprising smoothing out the formed set of aligned signatures with reduced dimensions by utilizing a moving average filter to improve prediction accuracy.

19. The signature verification method of claim 11, further comprising employing a Long Short-Term Memory (LSTM) layer of a neural network to:

determine a similarity probability between the signature data and the reference signature data based on the set of aligned signatures with reduced dimensions; and determine whether the determined similarity probability is more than a predefined threshold value to predict whether the received signature data is genuine.

20. The signature verification method of claim 19, wherein the LSTM layer is trained at least one of: western style signatures and eastern style signatures.

* * * * *